3,157,645
3-ALKENYL OR ALKINYL 1-(5-NITROFUR-FURYLIDENEAMINO) HYDANTOINS

Claude F. Spencer, Norwich, N.Y., assignor to The Norwich Pharmacal Company, a corporation of New York
No Drawing. Filed Dec. 6, 1961, Ser. No. 157,567
5 Claims. (Cl. 260—240)

This invention relates to a new series of closely related chemical compounds. More particularly this invention relates to a series of 3-alkenyl or alkinyl 1 - (5 - nitrofurfurylideneamino)hydantoins represented by the formula:

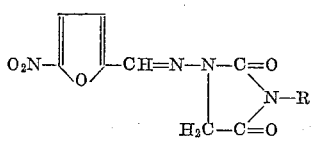

wherein R is a lower alkenyl or alkinyl radical and their preparation. Exemplary of the alkenyl and alkinyl radicals comprehended by this invention are allyl, 2 - methylallyl, 2-butenyl and 2-propynyl.

These compounds are crystalline solids. They are active as parasiticides and more particularly as antiprotozoal agents. When administered via the diet of poultry, they serve to prevent and combat cecal coccidiosis caused by *Eimeria tenella* and histomaniasis caused by *Histomonas meleagridis*; serious diseases of chickens which, if left untreated, result in heavy economic loss. The members of this new series of compounds effectively combat these diseases at a level of 0.011–0.022% by weight of the feed supply.

The compounds of this invention may be prepared according to the following reaction:

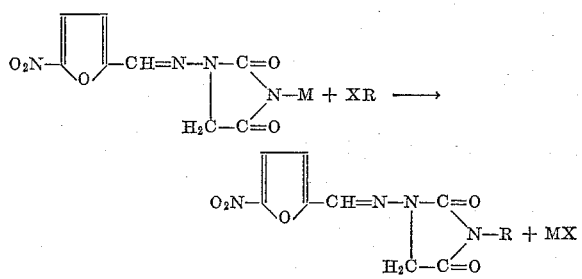

wherein R has the significance given above; M is an electropositive element such as sodium, potassium, ammonium or calcium; and X is a halogen. The reaction is carried out in the presence of an inert organic solvent such as dimethylformamide. It is preferably conducted under the influence of heat to hasten the formation of the desired product. Upon completion of the reaction the desired product may be separated in conventional fashion.

In carrying out the reaction of a salt of 1-(5-nitrofurfurylideneamino)-hydantoin, for instance, the sodium salt, and the alkene or alkine halide; for instance, allyl bromide, iodo-2-butene, 3-chloro-2-methylpropene or progargyl bromide; are brought together in equimolecular proportions in dimethylformamide and the mixture heated until the reaction is considered complete. The reaction mixture may be concentrated wholly to dryness or partially concentrated and cooled or poured into water to obtain the desired product which may be separated and recrystallized from suitable solvents such as ethanol, isopropanol or methanol or mixtures thereof with water.

In order that this invention may be available to and understood by those skilled in the art the following brief descriptive examples are appended as illustrative.

EXAMPLE I

3-Allyl-1-(5-Nitrofurfurylideneamino)Hydantoin

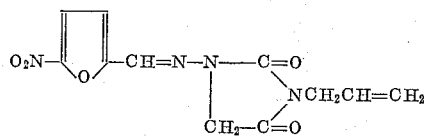

A mixture of 65 g. (0.25 mole) of sodium 1 - (5 - nitrofurfurylideneamino)hydantoin and 31 g. (0.26 mole) of allyl bromide in 500 ml. of dimethylformamide is heated on the steam bath for 2 hours. It is then concentrated under reduced pressure to a small volume and cooled in an ice bath. The yellow crystalline product is collected, washed with water, ethanol and ether and air dried. There are obtained 47.0 g. of (3-allyl-1-(5-nitrofurfurylideneamino)hydantoin (M.P. 170–172° C.).

EXAMPLE II 3-(2-Methylallyl)-1-(5-Nitrofurfurylideneamino)-Hydantoin

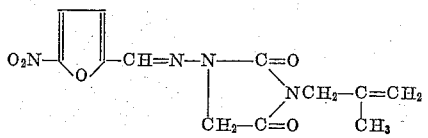

A mixture of 6.5 g. (0.25 m.) sodium 1 - (5 - nitrofurfurylideneamino)hydantoin and 2.5 g. (0.027 m.) of 3 - chloro-2-methylpropene in dimethylformamide is heated in an oil bath at 95–105° C. for 16 hours. After concentration under reduced pressure to a small volume, the solution is poured into 350 ml. of ice water. The solid is filtered, washed with water and ether, air-dried, and then oven-dried at 60° C. The yield of 3-(2-methylallyl)-1 - (5 - nitrofurfurylideneamino)hydantoin is 5.0 g. (68.5%). To purify this crude product it is dissolved in 200 ml. of boiling ethanol, treated with charcoal and filtered. The filtrate is heated to boiling and 250 ml. of hot water added. The solution is allowed to cool until crystallization begins and then kept in the refrigerator overnight. The crystals are filtered, M.P. 160–166° C. dec. Further recrystallization from ethanol-water and from isopropyl alcohol raises the M.P. to 167–168° C.

EXAMPLE III 3-(2-Butenyl)-1-(5-Nitrofurfurylideneamino)Hydantoin

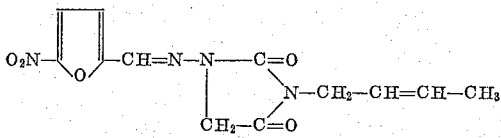

A mixture of 6.5 g. (0.025 m.) sodium 1-(5-nitrofurfurylideneamino)hydantoin, 4.9 g. (0.027 m.) of 1-iodo-2-butene and 1 g. of sodium bisulfite in 50 ml. of distilled dimethylformamide is heated 18 hrs. at 65–70° C. The reaction mixture is partially concentrated and poured into 300 ml. of ice water. The resulting precipitate is collected and washed with water, ethanol and dry ether. The yield of 3-(2-butenyl)-1-(5-nitrofurfurylideneamino)-hydantoin is 4.0 g. (55%), M.P. 157–163° C. It may be recrystallized from ethanol to yield 2.69 g. (37%), M.P. 170–172° C.

EXAMPLE IV 3-(2-Propynyl)-1-(5-Nitrofurfurylideneamino)-Hydantoin

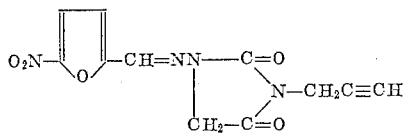

11.9 g. (0.1 mole) of propargyl bromide is added to a dimethylformamide solution of 26.0 g. (0.1 m.) sodium Furadantin, warming on a steam bath at 50°–60° C. with stirring. The reaction mixture is further heated on the steam bath at 90°–94° C. with stirring for 2 hours. The solution is evaporated at reduced pressure to dryness. The brown residual solid is recrystallized twice from methanol using charcoal for clarification. There are obtained 12.9 g. of 3-(2-propynyl)-1-5-nitrofurfurylideneamino)hydantoin (yield=47%) M.P. 237°–240° C.

What is claimed is:

1. A chemical compound represented by the formula:

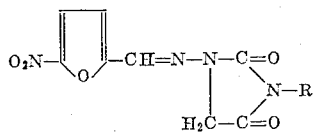

wherein R represents a member of the group consisting of allyl, 2-methylallyl, 2-butenyl and 2-propynyl.

2. The chemical compound 3-allyl-1-(5-nitrofurfurylideneamino)hydantoin represented by the formula:

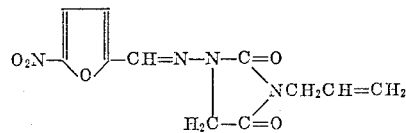

3. The chemical compound (3-(2-methylallyl)-1-(5-nitrofurfurylideneamino)hydantoin represented by the formula:

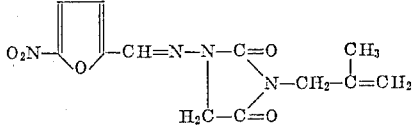

4. The chemical compound 3-(2-butenyl)-1-(5-nitrofurfurylideneamino)hydantoin represented by the formula:

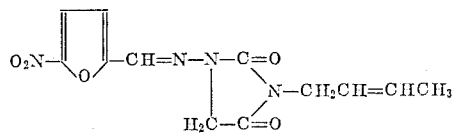

5. The chemical compound 3-(2-propynyl)-1-(5-nitrofurfurylideneamino)hydantoin represented by the formula:

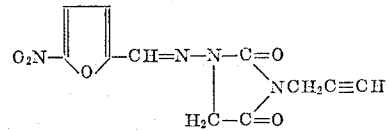

References Cited in the file of this patent

UNITED STATES PATENTS

| | | |
|---|---|---|
| 2,610,181 | Hayes | Sept. 9, 1952 |
| 2,759,002 | Close | Aug. 14, 1956 |
| 2,920,074 | Michels | Jan. 5, 1960 |
| 3,001,992 | Bellamy et al. | Sept. 26, 1961 |
| 3,013,943 | Berger | Dec. 19, 1961 |
| 3,075,974 | Michels | Jan. 29, 1963 |

FOREIGN PATENTS

| | | |
|---|---|---|
| 788,373 | Great Britain | Jan. 2, 1958 |